United States Patent
Arbeiter

[19]

[11] Patent Number: 5,964,123
[45] Date of Patent: Oct. 12, 1999

[54] TWIST-GRIP SHIFTER BICYCLE TRANSMISSIONS

[75] Inventor: Markus Arbeiter, Würzburg, Germany

[73] Assignee: Mannesmann Sachs AG, Schweinfurt, Germany

[21] Appl. No.: 08/988,578

[22] Filed: Dec. 11, 1997

[30] Foreign Application Priority Data

Dec. 12, 1996 [DE] Germany .................. 196 51 577

[51] Int. Cl.[6] .................................................. G05G 11/00
[52] U.S. Cl. ........................ 74/489; 74/502.6; 74/502.2
[58] Field of Search .................... 74/489, 473.14, 74/502.2, 502.4, 502.6, 501.6

[56] References Cited

U.S. PATENT DOCUMENTS

| | | |
|---|---|---|
| 5,134,897 | 8/1992 | Romano . |
| 5,429,012 | 7/1995 | Ikeda et al. ................... 74/502.2 X |
| 5,437,206 | 8/1995 | Boor .............................. 74/489 |
| 5,588,331 | 12/1996 | Huang et al. .................. 74/489 |
| 5,682,963 | 11/1997 | Tang ............................. 74/502.2 X |

FOREIGN PATENT DOCUMENTS

| | | |
|---|---|---|
| 0589048 | 3/1994 | European Pat. Off. . |
| 0671317 | 9/1995 | European Pat. Off. . |
| 0759393 | 2/1997 | European Pat. Off. . |
| 532462 | 8/1931 | Germany . |
| 936666 | 12/1955 | Germany . |
| 2940351 | 4/1980 | Germany . |
| 9412207 | 2/1995 | Germany . |
| 311029 | 5/1929 | United Kingdom . |
| 9628338 | 9/1996 | WIPO . |

OTHER PUBLICATIONS

"Campagnolo", Off Road Brochure, Jan. 1992, Italy.

Primary Examiner—John A. Jeffery
Assistant Examiner—David Fenstermacher
Attorney, Agent, or Firm—Nils H. Ljungman & Associates

[57] ABSTRACT

A shifter for the actuation of bicycle transmissions designed to be installed primarily on a handlebar of a bicycle. The shifter can have a stationary housing and a rotational housing that are connected together to form a single assembled unit. A traction cable having a nipple on one end can be inserted into the first end of a passageway in the single assembled unit. The passageway is sized such that the nipple and the traction cable may both pass through the passageway. The nipple end and traction cable can be pushed through the passageway until the nipple end comes out of the other end of the passageway. The nipple can then be fastened to the rotational housing without having to dismantle the single assembled unit.

20 Claims, 6 Drawing Sheets

TWIST-GRIP SHIFTER BICYCLE TRANSMISSIONS

BACKGROUND OF THE INVENTION

1. Field of the Invention

The present invention relates generally to a shifter for the actuation of transmissions on bicycles, in particular a twist-grip shifter which is suitable for installation on tube ends. The shifter primarily includes a stationary housing connected to the tube end and a housing, which housing has at least one lever, can be rotated by hand and is fixed in position axially in relation to the stationary housing. The stationary housing and the rotational housing form a single unit. Furthermore, the stationary housing has a projection or shoulder, which projection has a cable guide in a slot to guide a traction cable, and an abutment to support a shell, covering, wrapper or sheath around the traction cable. There can also be an opening for the insertion of the traction cable.

2. Background Information

German Utility Model G 94 12 207.5 describes a modified twist-grip shifter in a housing. The housing has a hole, through which hole the shifter cable can be replaced without having to disassemble the shifter grip. The hole in question has a diameter which is sufficient for the introduction of the shifter cable, but not its nipple, which nipple is fixed in the rotational housing of the modified twist-grip shifter. The shifter cable can therefore, only be replaced if the cable can be extracted from the overall system in the direction of the nipple. Consequently, the bicycle transmission must be detached from the shifter cable and thus from the shifter. The present invention, however, teaches that the traction cable and its shell can be connected to the shifter without having to detach the traction cable from the bicycle transmission. All that is necessary is to relax the shifter cable with respect to the shell by a traction cable adjustment and/or by shifting the transmission to a specified speed, so that a sufficient length of cable remains to suspend the nipple in the twist-grip shifter without having to release the shifter cable from the transmission.

Registration No. M 90 06 158.6 in the register of designs of the Federal Republic of Germany, also describes a twist-shifter for bicycle handlebars. The rotational housing of the twist-shifter has a fixing device for the nipple of the traction cable, whereby the traction cable can also be extracted from the shifter toward the nipple and re-introduced. The rotational housing also has actuator lugs in the radial direction which make possible an ergonomically efficient actuation of the bicycle transmission because their shape is adapted to the shape of the rider's hand. Here again, however, the disadvantage is that when the shifter cable is uncoupled from the twist-grip shifter, the cable must also be disconnected from the bicycle transmission, to replace either the shifter cable or the twist-grip shifter.

German Patent 936 666 describes a twist-grip for controlling the carburetor on motorcycles. An advantage of the twist-grip is that it employs simple means to simplify the suspension and removal of the cable nipple in comparison to similar known devices. The nipple of the actuator cable is installed and suspended by means of a spring-mounted or flexible suspension mechanism, which suspension mechanism projects out of a closable opening in one extreme position of the twist-grip. After the introduction of the cable shell into its specified position, the opening can be closed and the traction cable is then functional without having to disconnect the traction cable from the carburetor to which it is connected. The functionally correct principle taught by this patent is applicable to twist-grip shifters for bicycles only to a limited extent, however, because the space available in indexed twist-grip shifters does not permit the installation of such a structure, and on the other hand, for reasons of efficiency and economy, no additional costs for the cable suspension should be incurred.

OBJECT OF THE INVENTION

An object of the present invention is to create a removable fastening mechanism for a traction cable in a twist-grip shifter which no longer requires the uncoupling of the bicycle transmission. A second object of the present invention is to achieve a housing construction which essentially does not increase the cost of the shifter. A further object of the present invention is additional cost-neutral ergonomic improvements over known rotationally symmetrical twist-grip shifters through the housing configuration, in particular the configuration of the rotational housing.

SUMMARY OF THE INVENTION

The present invention teaches that these objects can be accomplished in accordance with at least one possible embodiment, by an arrangement in which a shifter, in particular a twist-grip shifter, for the actuation of transmissions on bicycles is suitable for installation on tube ends. The shifter can include a stationary housing connected to this tube end and a housing. The housing can have at least one lever, can be rotated by hand and can be fixed in position axially in relation to the stationary housing. The stationary housing and the rotational housing can form a single unit. Furthermore, the stationary housing can have a projection or shoulder, which projection can have a cable guide in a slot to guide a traction cable, and an abutment to support a shell, covering, wrapper or sheath around the traction cable. The shell of the traction cable can have an optional end piece. There preferably is also an opening for the insertion of the traction cable. The opening can be tunnel-shaped with two exits in the unit, which unit includes the stationary housing and the rotational housing. The opening is preferably of a size which makes it possible to push through a traction cable with a nipple, with the nipple in the lead, and to fasten the nipple to the rotational housing without having to remove or dismantle the unit or parts thereof.

In another possible embodiment of the present invention, the opening preferably has a bevel. The bevel can be used to guide the nipple of the traction cable outside of the unit formed by the rotational housing and the stationary housing. Once the nipple of the traction cable is outside the unit formed by the rotational housing and the stationary housing, the nipple of the traction cable can then be connected to the rotational housing.

In yet another possible embodiment of the present invention, the rotational housing preferably has a cable notch or slot in the vicinity of the bevel. The cable notch can be used to hold the traction cable after the nipple of the traction cable is attached to the rotational housing.

In still another possible embodiment of the present invention, the rotational housing preferably has a locator depression for the location of the nipple. The locator depression can be used to attach the nipple of the traction cable to the rotational housing after the traction cable has been placed in the cable notch.

In a further possible embodiment of the present invention, the cable notch is preferably located on the end of the bevel facing radially inward toward the center of the tube.

In another possible embodiment of the present invention, the opening can preferably be closed on at least one of its two ends by a cover.

In yet another possible embodiment of the present invention, a traction cable with a shell and an end piece is preferably fastened on a shifter, in particular a twist-grip shifter. The end piece may be located on the shell. The shifter can include a stationary housing and a rotational housing for the actuation of bicycle transmissions by the traction cable in a shell. The stationary housing and the rotational housing can form a tunnel-shaped opening. The stationary housing can have a projection with a cable guide in a slot and an abutment. The cable guide may have a curvature for the deflection of the traction cable. The rotational housing may also have a bevel, a cable notch and a locator depression for the location of a nipple on the traction cable. The installation of the traction cable on the shifter is preferably realized by the following series of steps: the extraction of the traction cable from its shell on the nipple; the introduction of the nipple into the opening adjacent to the cable guide by pushing on the traction cable; pushing the traction cable with the nipple in the lead until the nipple comes into contact with the bevel; continued pushing of the traction cable until the nipple is deflected on the bevel and projects out of the rotational housing; the insertion of the nipple into the locator depression with the simultaneous insertion of the traction cable into the cable notch; the placement of the traction cable in the slot on the cable guide; and the insertion of the shell with the end piece forward against the abutment.

In still another possible embodiment of the present invention, the shifter, in particular a twist-grip shifter, for the actuation of transmissions on bicycles is preferably suitable for installation on tube ends or on the handlebar of a bicycle. The shifter can include a stationary housing connected to the tube end, and a housing, which housing has at least one lever, can be rotated by hand and is axially fixed in position in relation to the stationary housing. The stationary housing and the rotational housing can form a single unit. Furthermore, the stationary housing can have a projection, which projection can have a cable guide in a slot to guide a traction cable. The projection can also have an abutment to support a shell around the traction cable. The shell around the traction cable can have an optional end piece. There is preferably also an opening for the insertion of the traction cable. On the rotational housing, there can be a first lever and a second lever both of which extend in the radial direction beyond the outside diameter of the rotational housing. The first lever can be oriented approximately coaxial to the tube center and point toward the tube end for actuation by the index finger. The second lever can also be oriented coaxial to the tube center and point away from the tube end for actuation by the thumb.

In a further possible embodiment of the present invention, the first lever, in an ergonomic configuration, preferably has a tip. The tip of the first lever can fit into the bend between the first and second joint of the index finger during the actuation of the first lever.

In another possible embodiment of the present invention, there preferably is a connecting fin located between the first lever and the second lever.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The twist-grip shifter for the actuation of bicycle transmissions is described in greater detail below, with reference to the embodiments illustrated in the accompanying drawings, wherein.

DESCRIPTION OF THE PREFERRED EMBODIMENT

Figure 1:
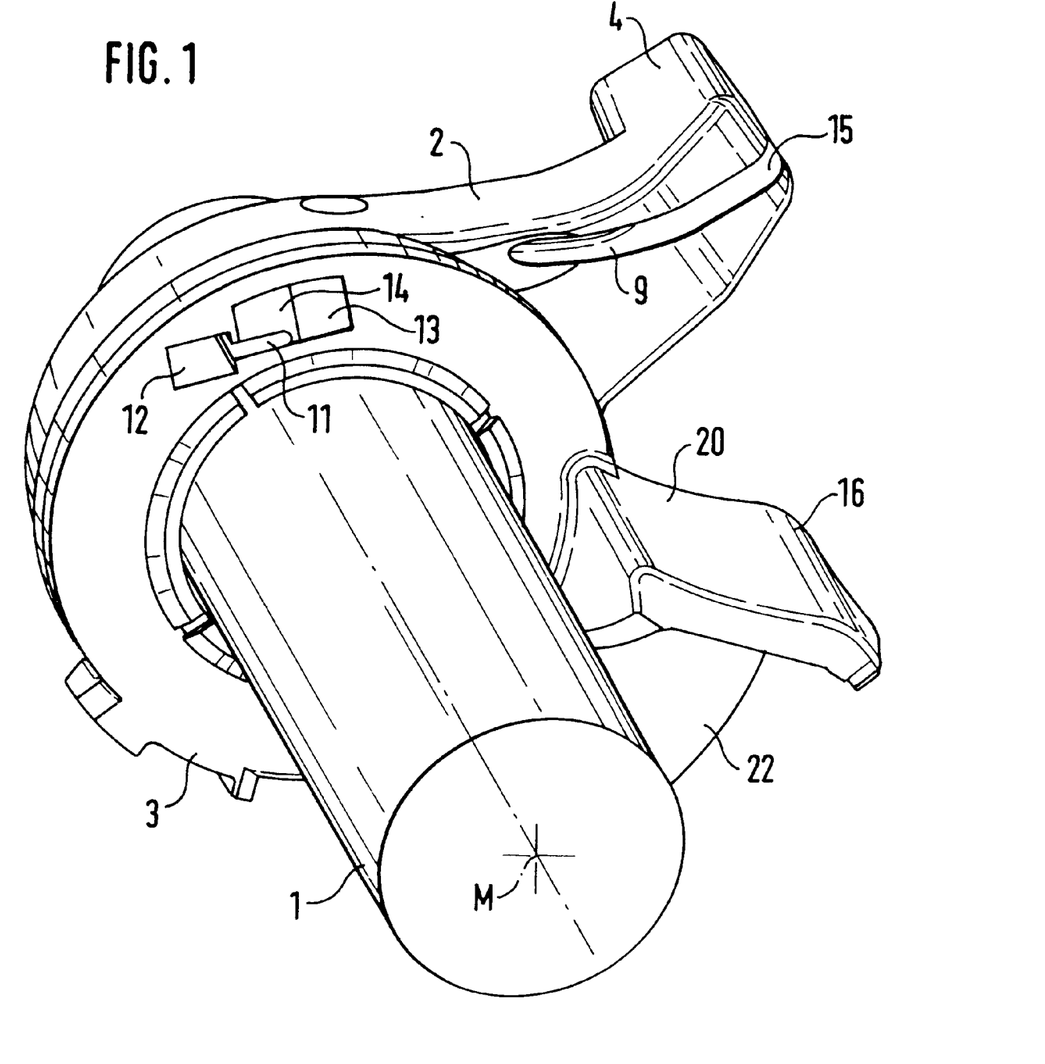
FIG. 1 shows a twist-grip shifter on a tube end with a stationary housing and a rotational housing.

The present invention relates to the configuration of a twist-grip shifter as shown in FIG. 1. The twist-grip shifter can be mounted on a tube end 1, in particular on the end of a handlebar (not shown). The twist-grip shifter is preferably fastened to the handlebar by a stationary housing 2. The stationary housing 2 can be clamped on the end of the handlebar. The stationary housing 2 and a rotational housing 3 can form a unit to the extent that the rotational housing 3 cannot be separated axially from the stationary housing 2 without special operations.

Figure 2:
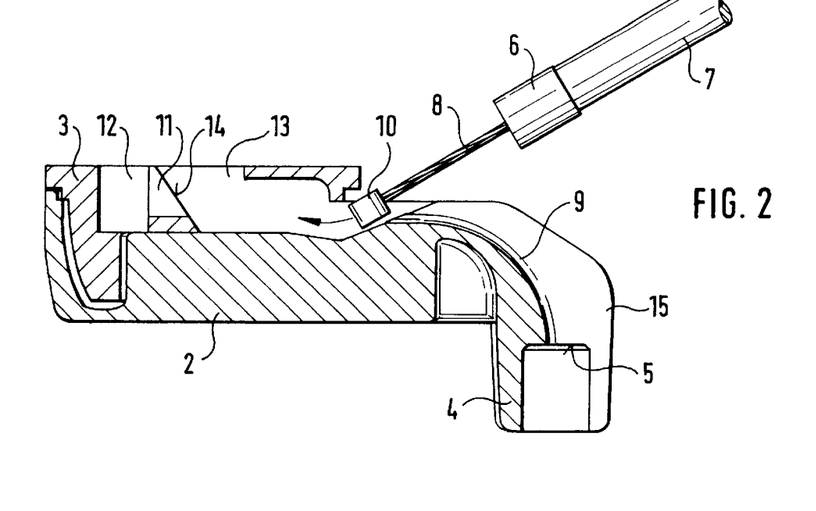
FIG. 2 shows in cross section a unit with an opening for the introduction of a traction cable with a nipple.

As shown in FIG. 2, the stationary housing 2 preferably has a projection 4. The projection 4, to deflect a traction cable 8, can have a slot 15 with a cable guide 9. The cable guide 9 preferably ends in an abutment 5. Against the abutment 5 a shell 7, which shell 7 surrounds the traction cable 8, preferably comes into contact. An end piece 6 of the traction cable 8 can be used between the shell 7 and the abutment 5. The traction cable 8, on one end, can have a nipple 10, which nipple 10 is to be connected to the rotational housing 3.

Figure 3:
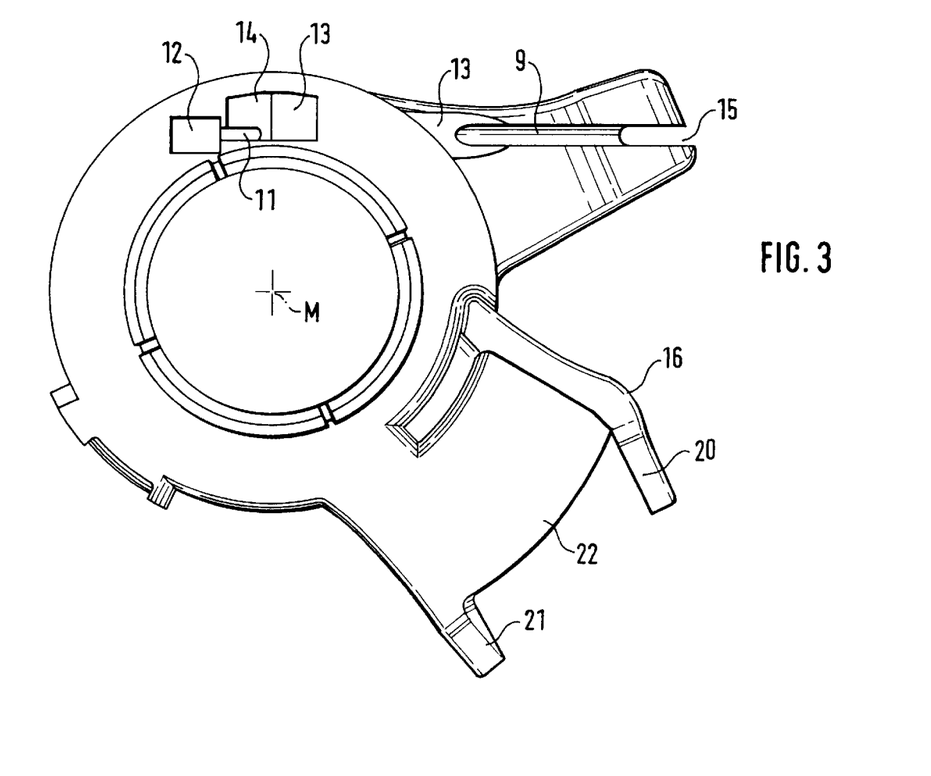
FIG. 3 shows the twist-grip shifter with a first lever and a second lever on the rotational housing.

As illustrated in FIG. 3, located on the rotational housing 3 are a first lever 20 and a second lever 21. The first lever 20 and the second lever 21 are preferably connected to one another by a connecting rib, fin or member 22. To connect the nipple 10 on the traction cable 8 with the rotational housing 3, the rotational housing 3 can have a tunnel-shaped opening or passageway 13. The tunnel-shaped opening 13 is preferably formed by the configuration of the unit formed by the stationary housing 2 and the rotational housing 3. The opening 13 can be of a size which makes it possible to push the nipple 10 of the traction cable 8 through the opening 13.

To lock the nipple 10 in place in the rotational housing 3, a bevel 14, a cable notch 11 and a locator depression 12 are located in the rotational housing 3.

Figure 4:
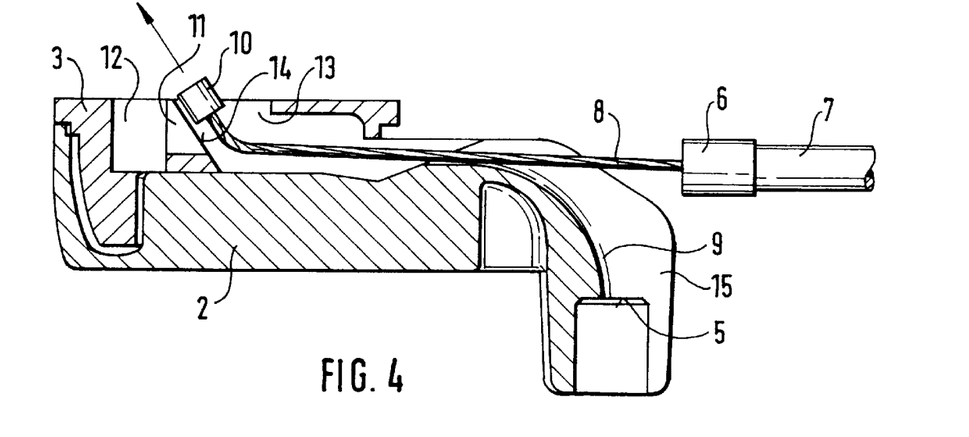
FIG. 4 shows the unit illustrated in FIG. 2, with the traction cable partly inserted.
Figure 5:
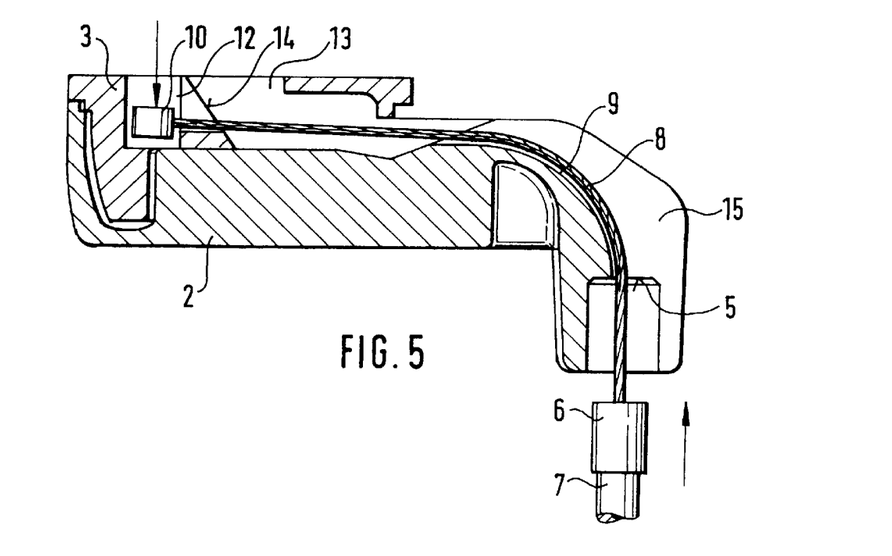
FIG. 5 shows the unit illustrated in FIGS. 2 and 4 with the traction cable inserted.

The fastening of the nipple 10 to the rotational housing 3 is illustrated essentially by the sequence of operations illustrated in FIGS. 2, 4 and 5. When the nipple 10 is introduced into the opening 13, the shell 7 with the end piece 6 is preferably pushed back toward the nipple 10, and the traction cable 8 is pushed into the opening 13 with the nipple 10 in front. The contours of the opening 13 formed by the housings 2 and 3 steer the nipple 10 toward the bevel 14. The bevel 14, as shown in FIG. 4, can deflect the nipple 10 and allow the nipple 10 to project out of the opening 13. The cable notch 11 worked into the bevel 14 is located on the bevel 14, as illustrated in FIG. 3, such that the cable notch 11 cannot interfere with the sliding of the nipple 10 on the bevel 14. In particular, the cable notch 11 is displaced sideways toward the tube center M so that the outside diameter of the nipple 10 can no longer come in contact with the cable notch 11. The nipple 10 which, as shown in FIG. 4, has emerged from the plane surface of the rotational housing 3, is then inserted by hand into the locator depression 12 provided for this nipple 10, whereby the traction cable 8 which projects from the nipple 10 is inserted into the cable notch 11. The traction cable 8 thus inserted into the rotational housing 3 is then fixed in position and tension can be applied to it, because the nipple 10 is fixed in the locator depression 12 in relation to the cable direction, because its diameter is greater than the width of the cable notch 11.

In another possible embodiment of the present invention, the end piece 6 and the shell 7 can be pushed away from the nipple 10 on the end of the traction cable 8. The nipple 10 can then be inserted into the opening 13 and can be pushed toward the bevel 14. Upon reaching the bevel 14, the nipple 10 can be forced out of another end of the opening 13. The nipple 10 can then be attached to the rotational housing 3 by placing the nipple 10 in the locator depression 12 and the traction cable 8 into the cable notch 11.

For the final insertion of the traction cable 8 into the unit formed by the stationary housing 2 and the rotational housing 3, all that is necessary is to fit the traction cable 8 into the curved cable guide 9 and to place the traction cable 8 in the slot 15 in the center of the abutment 5. The installation of the traction cable 8 can be completed when the shell 7 with the end piece 6 has been pushed against the abutment 5. The installation of the traction cable 8 in the unit formed by the housings 2 and 3 can be done when a bicycle transmission (not shown) has been shifted into a specified gear, without detaching the traction cable 8 from the transmission, namely in the extreme position in which the traction cable 8 is the most relaxed. By extracting the nipple 10 out of the shell 7, the transmission is shifted by a few speeds, and a sufficiently long piece of the traction cable 8 remains on the twist-grip shifter side of the traction cable 8 so that the nipple 10 can be pushed through to the locator depression 12.

Figure 6:
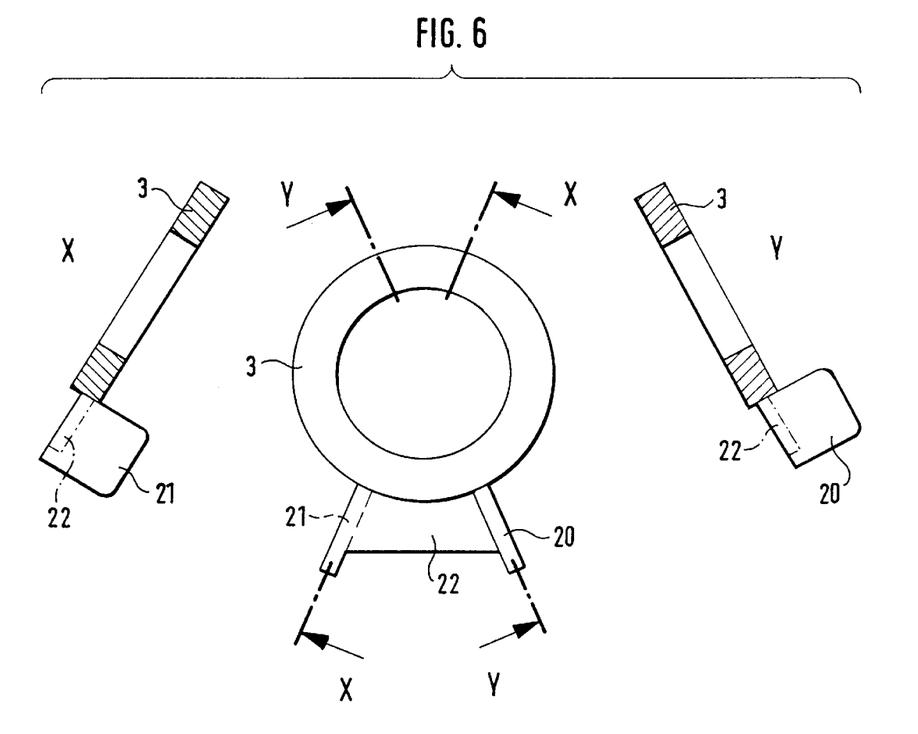
FIG. 6 shows the rotational housing as well as the location of the first and second levers.

In the simplified sketch shown in FIG. 6, levers 20 and 21, which levers 20 and 21 point essentially in the radial direction, can be located on the rotational housing 3. The first lever 20 can be oriented in the axial direction parallel to the tube center M and can point in the direction of the tube end 1. The second lever 21 is preferably oriented parallel to the tube center M and points in the opposite direction. The first lever 20 is preferably designed for the operation of the rotational housing 3 by the index finger of the rider. The second lever 21 can be designed for the operation of the rotational housing 3 by the thumb. When the rider grasps the tube end 1, and when the index finger comes into contact with the first lever 20, the second lever 21 must be at a specified distance from the first lever 20. This distance is approximately equal to the diameter of the tube end 1. For reasons of stability, the first lever 20 and the second lever 21 are preferably connected by a connecting rib 22. The connecting rib 22 can reinforce the structure of the twist-grip shifter, which twist-grip shifter is conventionally made of plastic, and which connecting rib 22 can protect the twist-grip shifter from damage caused by external factors.

The surface of the first lever 20, which first lever 20 comes in contact with the index finger, can have a tip 16. The tip 16 can represent an ergonomic improvement in the operation of the twist-grip shifter, in that the tip 16 preferably fits into the bend between the first and second joints of the index finger of the rider's hand. Likewise, the second lever 21, with which the thumb comes in contact, preferably has a shape which fits the first joint of the thumb.

Figure 7:
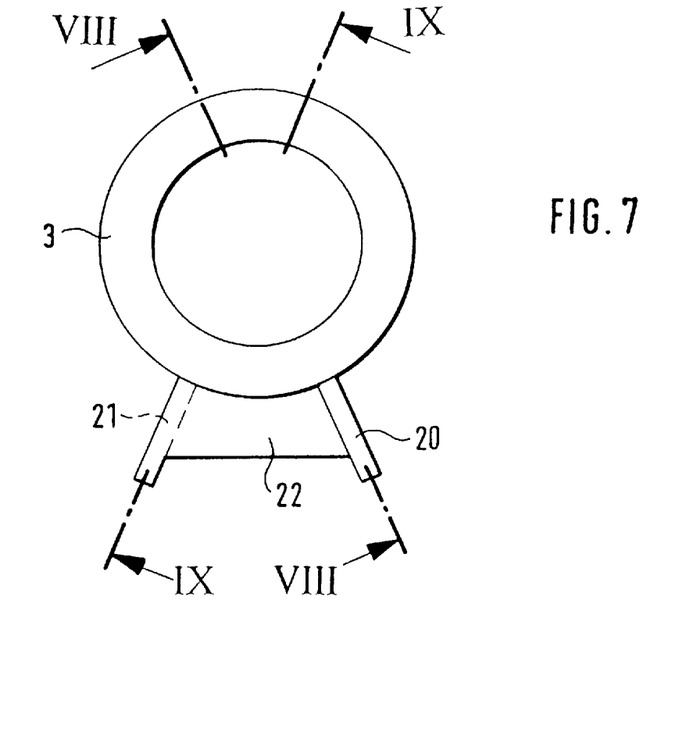
FIG. 7 shows the rotational housing as well as the first and second levers.
Figure 8:
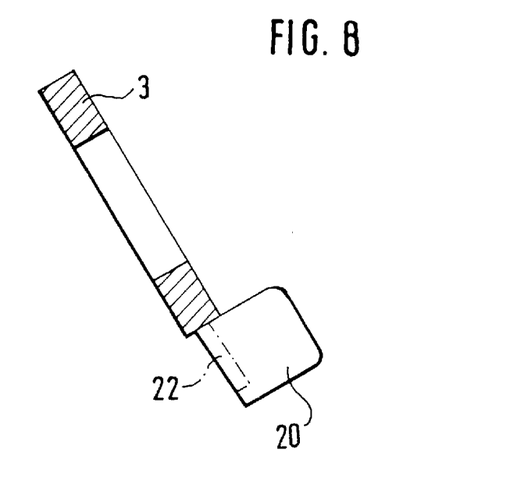
FIG. 8 shows a cross section of the first lever shown in FIG. 7.
Figure 9:
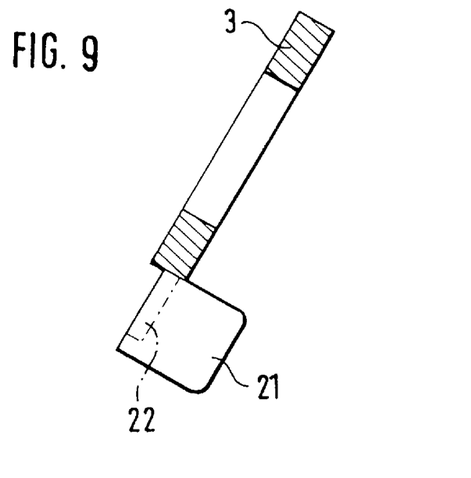
FIG. 9 shows a cross section of the second lever shown in FIG. 7.

In one possible embodiment of the present invention, FIG. 7 shows the rotational housing 3 along with the position of the first lever 20 and the second lever 21. A connecting fin or member 22 can be located between the first lever 20 and the second lever 21 to provide support for the first lever 20 and the second lever 21. FIG. 8 shows in a cross sectional view of the rotational housing 3 the orientation or position of the first lever 20. FIG. 9 shows in a cross sectional view of the rotational housing 3 the orientation or position of the second lever 21.

Figure 10:
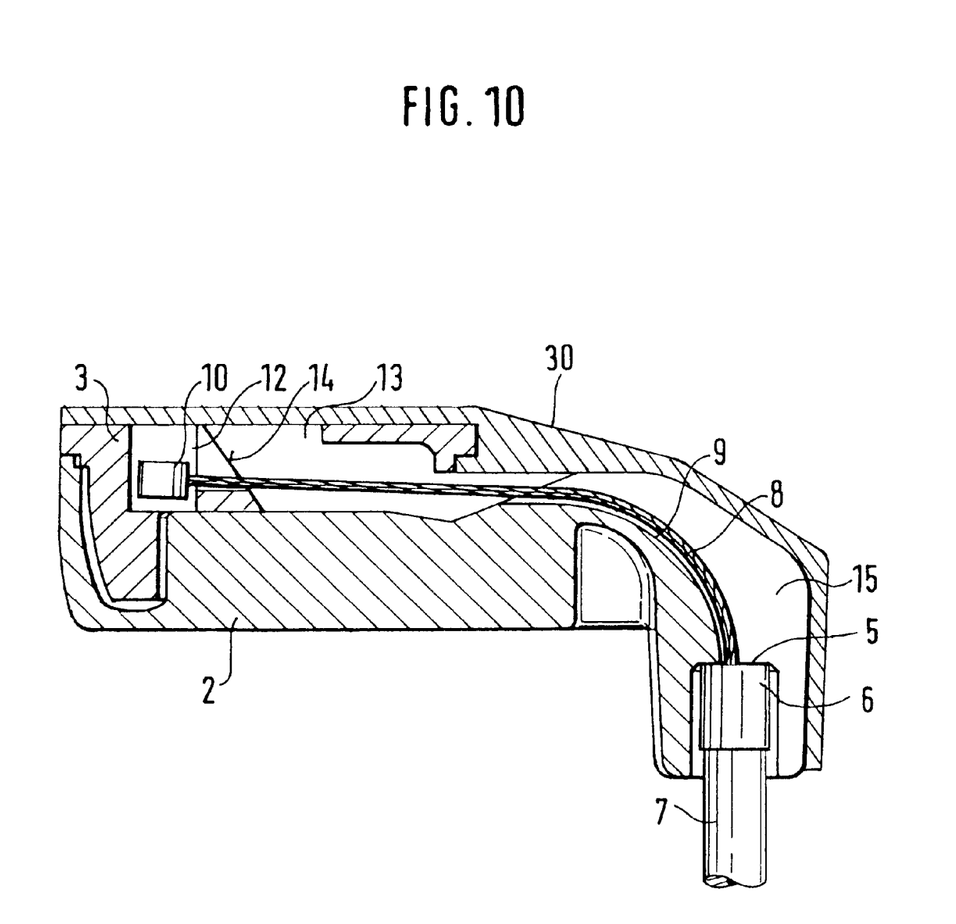
FIG. 10 shows the unit illustrated in FIG. 5 with a cover.

In another possible embodiment of the present invention, FIG. 10 shows the unit formed by the rotational housing 3 and the stationary housing 2. The traction cable 8 has preferably been installed and the end piece 6 of the shell 7 has preferably been pushed into contact with the abutment 5. A cover or plate 30 can then be used to cover one or both ends of the tunnel-shaped opening 13. The cover 30 can be one of many different shapes and sizes and can also be designed to possibly cover the depression 12, the bevel 14, the cable notch 11 and the cable guide 9, in addition to one or both of the ends of the tunnel-shaped opening 13. The cover 30 can preferably be used to keep dirt or other foreign substances from getting inside the unit formed by the rotational housing 3 and the stationary housing 2. Furthermore, the cover 30 can easily be removed in order to remove or adjust the existing traction cable 8 or to install a new traction cable 8.

In yet another possible embodiment of the present invention, the first lever 20 and the second lever 21 can preferably be designed to aid the rider of a bicycle in shifting the gears of a bicycle transmission with a twist-grip shifter by allowing the rider additional places to apply a force to turn the rotational housing 3. In addition, the unit formed the rotational housing 3 and the stationary housing 2 can also possibly have other components of a twist-grip shifter not shown in FIGS. 1–10. Some of the components may include an indicator of the current gear of the bicycle transmission and an apparatus to wind the traction cable 8 inside the unit formed by the rotational housing 3 and the stationary housing 2.

The teaching of the present invention therefore preferably has two functional advantages with regard to the configuration of the major parts of a twist-grip shifter, namely the improved insertion of the shifter cable and the improved ergonomic operation of the twist-grip shifter.

One feature of the invention resides broadly in the shifter for the actuation of transmissions on bicycles, in particular a twist-grip shifter which is suitable for installation on tube ends 1 and consists primarily of a stationary housing 2 connected to this tube end 1 and a housing 3 which has at least one lever 20, 21, can be rotated by hand and is fixed in position axially in relation to the stationary housing 2, whereby the stationary housing 2 and the rotational housing 3 form a single unit, whereby furthermore the stationary housing 2 has a projection or shoulder 4, which has a cable guide 9 in a slot 15 to guide a traction cable 8, and an abutment to support a shell, covering, wrapper or sheath 7 around the traction cable 8, with an optional end piece 6, whereby there is also an opening 13 for the insertion of the traction cable 8, characterized by the fact that the opening 13 is tunnel-shaped with two exits in the unit which consists of the stationary housing 2 and the rotational housing 3, and is of a size which makes it possible to push through a traction cable 8 with a nipple 10 with the nipple 10 in the lead, and to fasten the nipple 10 to the rotational housing 3 without having to remove or dismantle the unit or parts thereof.

Another feature of the invention resides broadly in the shifter characterized by the fact that the opening 13 has a bevel 14.

Yet another feature of the invention resides broadly in the shifter characterized by the fact that the rotational housing 3 has a cable notch or slot 11 in the vicinity of the bevel 14.

Still another feature of the invention resides broadly in the shifter characterized by the fact that the rotational housing 3 has a locator depression 12 for the location of the nipple 10.

A further feature of the invention resides broadly in the shifter characterized by the fact that the cable notch 11 is located on the end of the bevel 14 facing radially inward toward the center M of the tube.

Another feature of the invention resides broadly in the shifter characterized by the fact that the opening 13 can be closed on at least one of its two ends by means of a cover.

Yet another feature of the invention resides broadly in the method for fastening a traction cable with a shell 7 and with and end piece 6 which may be located on the shell 7 on a shifter, in particular a twist-grip shifter, which consists essentially of a stationary housing 2 and a rotational housing 3 for the actuation of bicycle transmissions by means of this traction cable 8 in a shell 7, whereby the stationary housing 2 and the rotational housing 3 form a tunnel-shaped opening 13, and the stationary housing 2 has a projection 4 with a cable guide 9 in a slot 15 and an abutment 5, whereby the cable guide 9 has a curvature for the deflection of the traction cable 8, whereby the rotational housing 3 also has a bevel 14, a cable notch 11 and a locator depression 12 for the location of a nipple 10 on the traction cable 8, whereby the installation of the traction cable on the shifter is further characterized by the following steps: extraction of the traction cable 8 from its shell 7 on the nipple 10; introduction of the nipple 10 into the opening 13 adjacent to the cable guide 9 by pushing on the traction cable 8; pushing the traction cable 8 with the nipple 10 in the lead until the nipple 10 comes into contact with the bevel 14; continued pushing of the traction cable 8 until the nipple 10 is deflected on the bevel 14 and projects out of the rotational housing 3; insertion of the nipple 10 into the locator depression 12 with the simultaneous insertion of the traction cable 8 into the cable notch 11; placement of the traction cable 8 in the slot 15 on the cable guide 9; and insertion of the shell 7 with the end piece 6 forward against the abutment 5.

Still another feature of the invention resides broadly in the shifter for the actuation of transmissions on bicycles, in particular a twist-grip shifter which is suitable for installation on tube ends 1 and consists essentially of a stationary housing 2 connected to this tube end 1, and of a housing 3 which has at least one lever 20, 21, can be rotated by hand and is axially fixed in position in relation to with the stationary housing 2, whereby the stationary housing 2 and the rotational housing 3 form a single unit, whereby furthermore the stationary housing 2 has a projection 4, which has a cable guide 9 in a slot 15 to guide a traction cable 8, and an abutment to support a shell 7 around the traction cable 8, with an optional end piece 6, whereby there is also an opening 13 for the insertion of the traction cable 8, characterized by the fact that on the rotational housing 3, there are a first lever 20 and a second lever 21 which extend in the radial direction beyond the outside diameter of the rotational housing 3, whereby the first lever 20 is oriented approximately coaxial to the tube center M and points toward the tube end 1 for actuation by means of the index finger, and whereby the second lever 21 is also oriented coaxial to the tube center M and points away from the tube end 1 for actuation by means of the thumb.

A further feature of the invention resides broadly in the shifter characterized by the fact that the first lever 20, in an ergonomic configuration, has a tip 16 which fits into the bend between the first and the second joint of the index finger during the actuation of the first lever 20.

Another feature of the invention resides broadly in the shifter characterized by the fact that there is a connecting fin 22 located between the first lever 20 and the second lever 21.

Types of seals which may be utilized or adapted for use in accordance with the present invention may be disclosed in the following U.S. Patents: U.S. Pat. No. 5,184,684 to Kohlman on Feb. 9, 1993; U.S. Pat. No. 5,209,497 to Von Bergen et al. on Sep. 5, 1991; U.S. Pat. No. 5,209,499 to Ruff et al. on May 11, 1993; U.S. Pat. No. 5,213,342 to Weber on May 25, 1993; U.S. Pat. No. 5,267,739 to Vaughan on Dec. 7, 1993; U.S. Pat. No. 5,324,046 to Tomatis on Jun. 28, 1994; U.S. Pat. No. 5,370,404 to Klein et al. on Dec. 6, 1994; U.S. Pat. No. 5,186,548 to Sink on Feb. 16, 1993; U.S. Pat. No. 5,207,436 to Lederman on May 4, 1993; U.S. Pat. No. 5,244,113 to Stymiest on Sep. 14, 1993; U.S. Pat. No. 5,372,389 to Tam et al. on Jun. 22, 1993; U.S. Pat. No. 5,409,181 to Patrick on Jul. 26, 1993; U.S. Pat. No. 5,417,441 to Hill on May 23, 1995; U.S. No. Pat. 5,228,700 to Biesold et al. on Mar. 2, 1992; and U.S. Pat. No. 5,368,314 to Victor et al. on Nov. 29, 1994.

Types of shifting actuators and components thereof which may be utilized in accordance with the present invention may be disclosed in the following U.S. Patents: U.S. Pat. No. 4,055,093 to Ross; U.S. Pat. No. 4,194,408 to Hedrich; U.S. Pat. No. 4,201,095 to Cirami; U.S. Pat. No. 4,267,744 to Yamasaki; U.S. Pat. No. 4,384,864 to Bonnard; U.S. Pat. No. 4,504,250 to Juy; U.S. Pat. No. 4,599,079 to Chappell; U.S. Pat. No. 4,693,700 to Chappell; U.S. Pat. No. 5,033,991 to McLaren; and U.S. Pat. No. 5,135,441 to Gelbien.

Types of transmissions for bicycles, and components thereof, which may be utilized in accordance with the embodiments of the present invention may be disclosed in the following U.S. Patents: U.S. Pat. No. 3,944,253 to Ripley on Mar. 16, 1976; U.S. Pat. No. 4,973,297 to Bergles on Nov. 27, 1990; U.S. Pat. No. 4,721,015 to Hartmann on Jan. 26, 1988; U.S. Pat. No. 4,063,469 to Bergles on Dec. 20, 1977; U.S. Pat. No. 4,727,965 to Zach et al.; U.S. Pat. No. 4,721,013 to Steuer et al.; U.S. Pat. No. 4,651,853 to Bergles et al.; U.S. Pat. No. 4,628,769 to Nagano; U.S. Pat. No. 4,400,999 to Steuer; and U.S. Pat. No. 5,443,279 to Nurnberger.

Examples of bicycle derailleur cable actuating systems which may possibly be utilized or adapted for use in accordance with the present invention may be found in the following U.S. Patents: U.S. Pat. No. 5,197,927 to Patterson et al. on Mar. 30, 1993; U.S. Pat. No. 5,102,372 to Patterson et al. on Apr. 7, 1992; and U.S. Pat. No. 4,938,733 to Patterson on Jul. 3, 1990.

Examples of bicycles which may possibly utilized or adapted for use in the context of the present invention may be found in the following U.S. Patents: U.S. Pat. No. 5,324,059, to Bryne on Jun. 28, 1994; U.S. Pat. No. 5,312,125, to Tse-acu-a-o-shu on May 17, 1994; U.S. Pat. No. 5,242,182, to Bezerra et al. on Sep. 7, 1993; and U.S. Pat. No. 5,240,268, to Allsop et al. on Aug. 31, 1993.

Examples of derailleurs which may possibly be utilized or adapted for use in accordance with the present invention may be found in the following U.S. Pat. No. 4,439,171, to Bergles on Mar. 27, 1984; U.S. Pat. No. 4,231,264, to Bergles on Nov. 4, 1980; U.S. Pat. No. 4,183,255, to Leiter on Jan. 15, 1980; and U.S. Pat. No. 3,927,904, to Bergles on Dec. 23, 1975.

Examples of bicycle shifting mechanisms which may possibly be utilized or adapted for use in accordance with the present invention may be disclosed in the following U.S. Patents: U.S. Pat. No. 4,900,291, to Patterson on Feb. 13, 1990; U.S. Pat. No. 4,938,733, to Patterson on Jul. 3, 1990; U.S. Pat. No. 5,009,629, to Tagawa on Apr. 23, 1991; U.S. Pat. No. 5,102,372, to Patterson et al on Apr. 7, 1992; U.S. Pat. No. 5,135,441, to Gelbien on Aug. 4, 1992; U.S. Pat. No. 5,178,033, to Kund on Jan. 12, 1993; U.S. Pat. No. 5,186,071, to Iwasaki on Feb. 16, 1993; U.S. Pat. No. 5,186,072, to Nagano on Feb. 16, 1993; U.S. Pat. No. 5,191,807, to Hsu on Mar. 9, 1993; U.S. Pat. No. 5,197,927, to Patterson et al on Mar. 30, 1993; U.S. Pat. No. 5,205,794, to Browning on Apr. 27, 1993; U.S. Pat. No. 5,213,005, to Nagano on May 25, 1993; U.S. Pat. No. 5,241,878, to Nagano on Sep. 07, 1993; U.S. Pat. No. 5,287,766, to Nagano on Feb. 22, 1994; U.S. Pat. No. 5,303,608, to Iwasaki on Apr. 19, 1994; U.S. Pat. No. 5,315,891, to Tagawa on May 31, 1994; U.S. Pat. No. 5,322,487, to Nagano on Jun. 21, 1994; U.S. Pat. No. 5,325,735, to Nagano on Jul. 5, 1994; U.S. Pat. No. 5,354,240, to Hunter, Jr. on Oct. 11, 1994; U.S. Pat. No. 5,355,745, to Wu and Hsuan on Oct. 18, 1994; and U.S. Pat. No. 5,361,645, to Feng and Kang on Nov. 08, 1994.

Some examples of latching shifters which may possibly be utilized or adapted for use in accordance with the present invention may be disclosed in the following patents: U.S. Pat. No. 5,421,219 to Maeda and Bridgestone; U.S. Pat. No. 5,390,565 to Maeda and Bridgestone; U.S. Pat. No. 5,315,891 to Maeda; U.S. Pat. No. 5,241,877 issued Sep. 7, 1993; Federal Republic of Germany Patent DE 32 15 426 A1 to Fichtel & Sachs; and Federal Republic of Germany Patent DE 38 23 741 A1 to Shimano.

Some examples of twist-grip shifters which may possibly be utilized or adapted for use in accordance with the present invention may be disclosed in the following patents: U.S. Pat. No. 3,218,879 to Raleigh; U.S. Pat. No. 5,134,897 to Campagnolo; U.S. Pat. No. 4,938,733 to Sram Corporation; U.S. Pat. No. 4,900,291 to Sram Corporation; Federal Republic of Germany Patent DE 32 15 427 A1 to Fichtel & Sachs and Federal Republic of Germany Patent No. DE 37 27 933 A1.

The following U.S. Patents: U.S. Pat. No. 5,588,925 to Arbeiter and Weishaupt on Dec. 31, 1996 and U.S. Pat. No. 5,666,859 to Arbeiter on Sep. 16, 1997 are hereby incorporated by reference as if set forth in their entirety herein.

The following U.S. patent applications: Ser. No. 08/610,655, filed on Mar. 4, 1996 and having inventor Klaus Neumann; Ser. No. 08/610,620, filed on Mar. 4, 1996 and having inventor Markus Arbeiter; Ser. No. 08/610,651, filed on Mar. 4, 1996 and having inventor Markus Arbeiter; Ser. No. 08/610,657, filed on Mar. 4, 1996 and having inventor Markus Arbeiter; Ser. No. 08/825,813, filed on Apr. 3, 1997 and having inventor Nico Lemmens; Ser. No. 08/926,818, filed on Sep. 10, 1997 and having inventors Berndt Leiter, Bernhard Johanni, Max Rumpel, Klaus Konig, Klaus Stuhler and Markus Arbeiter; and Ser. No. 08/844,099, filed on Apr. 25, 1997 and having inventors Markus Arbeiter and Nico Lemmens are hereby incorporated by reference as if set forth in their entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 51 577.7, filed on Dec. 12, 1996, having inventor Markus Arbeiter, and DE-OS 196 51 577.7 and DE-PS 196 51 577.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A shifter, suitable for installation on a tube end to actuate a transmission on a bicycle, said shifter comprising:

a stationary housing being configured to be connected to a tube end;

said stationary housing having a longitudinal axis;

a rotational housing being configured to be rotated by a hand of a rider;

said rotational housing being fixed in position axially in relation to said stationary housing;

said stationary housing and said rotational housing being connected together to form a single assembled unit;

a traction cable being configured to be disposed in said stationary housing;

said traction cable comprising a nipple;

a passageway being disposed in said single assembled unit and configured to receive a traction cable;

said passageway being configured to permit the insertion of said traction cable;

said passageway comprising a first exit and a second exit disposed in said single assembled unit;

said first exit being configured and disposed to permit receiving of said traction cable and said nipple into said passageway;

said second exit being configured and disposed to permit exiting of said traction cable and said nipple from said passageway;

said passageway and said exits being sized to permit said nipple and said traction cable to be pushed through said passageway and said exits; and said passageway and said second exit being configured and disposed to permit said nipple to be fastened to said rotational housing without having to dismantle said single assembled unit.

2. The shifter according to claim 1, wherein said passageway comprises a bevel.

3. The shifter according to claim 2, wherein said rotational housing comprises a cable notch disposed adjacent to said bevel.

4. The shifter according to claim 3, wherein said rotational housing comprises a locator depression for the location of said nipple.

5. The shifter according to claim 4, wherein:

said bevel has a first end and a second end;

said first end is disposed opposite said second end;

said first end is disposed a distance from the longitudinal axis of said stationary housing;

said second end is disposed a distance from the longitudinal axis of said stationary housing;

the distance between said first end and the longitudinal axis of said stationary housing is less than the distance between said second end and the longitudinal axis of said stationary housing; and said cable notch is located on said first end of said bevel.

6. The shifter according to claim 5, further comprising:

a cover; and said cover being configured and disposed to close at least one of said two exits of said opening.

7. The shifter according to claim 6, wherein:

said rotational housing comprises at least one lever;

said stationary housing comprises a projection;

said projection comprises a cable guide in a slot to guide said traction cable;

said traction cable comprises a shell disposed around said traction cable;

said shell of said traction cable comprises an end piece;

said projection comprises an abutment to support said shell of said traction cable; and said opening is substantially tunnel-shaped.

8. The shifter according to claim 7, wherein:

said single assembled unit comprises a first side and a second side;

said first side is disposed opposite said second side;

said first side is configured to be disposed upon installation on a bicycle toward a tube end;

said second side is configured to be disposed upon installation on a bicycle away from a tube end;

said rotational housing has an outer surface;

said outer surface comprises a circular circumference;

said at least one lever comprises a first lever and a second lever;

each of said first lever and said second lever is disposed to extend in a substantially radial direction away from the longitudinal axis of said stationary housing beyond the circular circumference of said rotational housing;

said first lever is disposed about the longitudinal axis of said stationary housing;

said first lever is configured to rotate substantially about the longitudinal axis of said stationary housing;

said first lever is disposed adjacent said first side;

said first lever is configured to be actuated by an index finger of a rider;

said second lever is disposed about the longitudinal axis of said stationary housing;

said second lever is configured to rotate substantially about the longitudinal axis of said stationary housing;

said second lever is disposed adjacent said second side; and said second lever is configured to be actuated by a thumb of a rider.

9. The shifter according to claim 8, wherein:

said first lever comprises a tip; and said tip is configured to fit into a bend between the first and second joint of an index finger of a rider during actuation of said first lever.

10. The shifter according to claim 9, further comprising a connecting fin located between said first lever and said second lever.

11. A shifter, suitable for installation on a tube end to actuate a transmission on a bicycle, said shifter comprising:

a stationary housing being configured to be connected to a tube end;

said stationary housing having a longitudinal axis;

a rotational housing being configured to be rotated by a hand of a rider;

said rotational housing being fixed in position axially in relation to said stationary housing;

said stationary housing and said rotational housing being connected together to form a single assembled unit;

said single assembled unit comprising a first side and a second side;

said first side being disposed opposite said second side;

said first side being configured to be disposed upon installation on a bicycle toward a tube end;

said second side being configured to be disposed upon installation on a bicycle away from a tube end;

said rotational housing having an outer surface;

said outer surface comprising a circular circumference;

said at least one lever comprising a first lever and a second lever;

each of said first lever and said second lever being disposed to extend in a substantially radial direction away from the longitudinal axis of said stationary housing beyond the circular circumference of said rotational housing;

said first lever being disposed about the longitudinal axis of said stationary housing;

said first lever being configured to rotate substantially about the longitudinal axis of said stationary housing;

said first lever being disposed adjacent said first side;

said first lever being configured to be actuated by an index finger of a rider;

said second lever being disposed about the longitudinal axis of said stationary housing;

said second lever being configured to rotate substantially about the longitudinal axis of said stationary housing;

said second lever being disposed adjacent said second side; and said second lever being configured to be actuated by a thumb of a rider.

12. The shifter according to claim 11, wherein:

said first lever comprises a tip; and said tip is configured to fit into a bend between the first and second joint of an index finger of a rider during actuation of said first lever.

13. The shifter according to claim 12, further comprising a connecting fin located between said first lever and said second lever.

14. The shifter according to claim 13, further comprising:

a traction cable being disposed in said stationary housing;

said stationary housing comprising a projection;

said projection comprising a cable guide in a slot to guide said traction cable;

said traction cable comprising a shell disposed around said traction cable;

said shell of said traction cable comprising an end piece;

said projection comprising an abutment to support said shell of said traction cable;

a passageway being disposed in said single assembled unit and configured to receive a traction cable; and said passageway being configured to permit the insertion of said traction cable.

15. The shifter according to claim 14, wherein:

said traction cable comprises a nipple;

said passageway is substantially tunnel-shaped;

said passageway comprises a first exit and a second exit disposed in said single assembled unit;

said first exit is configured and disposed to permit receiving of said traction cable and said nipple into said passageway;

said second exit is configured and disposed to permit exiting of said traction cable and said nipple from said passageway;

said passageway and said exits are sized to permit said nipple and said traction cable to be pushed through said passageway and said exits; and said passageway and said second exit are configured and disposed to permit said nipple to be fastened to said rotational housing without having to dismantle said single assembled unit.

16. The shifter according to claim 15, wherein said passageway comprises a bevel.

17. The shifter according to claim 16, wherein:

said rotational housing comprises a cable notch disposed adjacent to said bevel;

said rotational housing comprises a locator depression for the location of said nipple;

said bevel comprises a first end and a second end;

said first end is disposed opposite said second end;

said first end is disposed a distance from the longitudinal axis of said stationary housing:

said second end is disposed a distance from the longitudinal axis of said stationary housing:

the distance between said first end and the longitudinal axis of said stationary housing is less than the distance between said second end and the longitudinal axis of said stationary housing;

said cable notch is located on said first end of said bevel;

said shifter comprises a cover; and said cover is configured and disposed to close at least one of said two exits of said opening.

18. A method of attaching a traction cable to a shifter, suitable for installation on a tube end to actuate a transmission on a bicycle, said shifter comprising: a stationary housing being configured to be connected to a tube end; said stationary housing having a longitudinal axis; a rotational housing being configured to be rotated by a hand of a rider; said rotational housing being fixed in position axially in relation to said stationary housing; said stationary housing and said rotational housing being connected together to form a single assembled unit; a traction cable being configured to be disposed in said stationary housing; said traction cable comprising a nipple; said nipple being disposed on an end of said traction cable; a passageway being disposed in said single assembled unit and configured to receive a traction cable; said passageway comprising a first exit and a second exit disposed in said single assembled unit; said first exit being configured and disposed to permit receiving of said traction cable and said nipple into said passageway; said second exit being configured and disposed to permit exiting of said traction cable and said nipple from said passageway; said passageway and said exits being sized to permit said nipple and said traction cable to be pushed through said passageway and said exits; and said passageway and said second exit being configured and disposed to permit said nipple to be fastened to said rotational housing without having to dismantle said single assembled unit; said method comprising the steps of:

introducing the nipple into the first exit of the passageway by pushing on the traction cable;

pushing the nipple with the traction cable with the nipple end first into the passageway;

continuing the pushing of the traction cable until the nipple is deflected;

pushing the traction cable until the nipple projects out of the second exit in the rotational housing; and fastening the nipple to the rotational housing without having to dismantle the single assembled unit.

19. The method for attaching a traction cable to a shifter according to claim 18, wherein: said passageway comprises a bevel; said rotational housing comprises a cable notch disposed adjacent to said bevel; said rotational housing comprises a locator depression for the location of said nipple; said bevel has a first end and a second end; said first end is disposed opposite said second end; said first end is disposed a distance from the longitudinal axis of said stationary housing: said second end is disposed a distance from the longitudinal axis of said stationary housing: the distance between said first end and the longitudinal axis of said stationary housing is less than the distance between said second end and the longitudinal axis of said stationary housing; said cable notch is located on said first end of said bevel; said method further comprising the steps of:

pushing the traction cable until the nipple deflects against the bevel and exiting said nipple from said passageway; and disposing said traction cable in said cable notch.

20. The method for attaching a traction cable to a shifter according to claim 19, wherein: said rotational housing comprises at least one lever; said stationary housing comprises a projection; said projection comprises a cable guide in a slot to guide said traction cable; said traction cable comprises a shell disposed around said traction cable; said shell of said traction cable comprises an end piece; said projection comprises an abutment to support said shell of said traction cable; said opening is substantially tunnel-shaped; said single assembled unit comprises a first side and a second side; said first side is disposed opposite said second side; said first side is configured to be disposed upon installation on a bicycle toward a tube end; said second side is configured to be disposed upon installation on a bicycle away from a tube end; said rotational housing has an outer surface; said outer surface comprises a circular circumference; said at least one lever comprises a first lever and a second lever; each of said first lever and said second lever is disposed to extend in a substantially radial direction away from the longitudinal axis of said stationary housing beyond the circular circumference of said rotational housing; said first lever is disposed about the longitudinal axis of said stationary housing; said first lever is configured to rotate substantially about the longitudinal axis of said stationary housing; said first lever is disposed adjacent said first side; said first lever is configured to be actuated by an index finger of a rider; said second lever is disposed about the longitudinal axis of said stationary housing; said second lever is configured to rotate substantially about the longitudinal axis of said stationary housing; said second lever is disposed adjacent said second side; and said second lever is configured to be actuated by a thumb of a rider; said method further comprising the steps of:

extracting the nipple and traction cable from the shell of the traction cable before said step of introducing the nipple into the first exit of the passageway;

inserting the nipple into the locator depression and substantially simultaneously inserting the traction cable into the cable notch after the step of deflecting the nipple with the bevel;

placing the traction cable in the slot on the cable guide; and inserting the shell with the end piece against the abutment.

* * * * *